(12) United States Patent
Zheng et al.

(10) Patent No.: US 7,967,297 B2
(45) Date of Patent: Jun. 28, 2011

(54) THERMALLY-ACTIVATED CONTROL GAP BRUSH SEAL

(75) Inventors: Xiaoqing Zheng, East Greenwich, RI (US); Charles A. Trabert, Tiverton, RI (US); Anthony G. O'Meara, Providence, RI (US); Joshua J. Duquette, Coventry, RI (US)

(73) Assignee: Eaton Corporation, Cleveland, OH (US)

( * ) Notice: Subject to any disclaimer, the term of this patent is extended or adjusted under 35 U.S.C. 154(b) by 768 days.

(21) Appl. No.: 11/685,527

(22) Filed: Mar. 13, 2007

(65) Prior Publication Data

US 2008/0224414 A1    Sep. 18, 2008

(51) Int. Cl.
*F16J 15/44*    (2006.01)
(52) U.S. Cl. ........................................ 277/355
(58) Field of Classification Search ............ 277/355
See application file for complete search history.

(56) References Cited

U.S. PATENT DOCUMENTS

| | | | |
|---|---|---|---|
| 5,351,971 A | 10/1994 | Short | |
| 5,401,036 A | 3/1995 | Basu | |
| 5,474,305 A * | 12/1995 | Flower | 277/355 |
| 5,794,938 A | 8/1998 | Hofner | |
| 5,799,952 A | 9/1998 | Morrison | |
| 5,884,918 A * | 3/1999 | Basu et al. | 277/355 |
| 6,231,047 B1 * | 5/2001 | Cunningham et al. | 277/355 |
| 6,250,641 B1 | 6/2001 | Dinc | |
| 6,672,073 B2 * | 1/2004 | Wiebe | 60/796 |
| 2004/0046327 A1 | 3/2004 | Menendez | |
| 2004/0100030 A1 | 5/2004 | Addis | |
| 2004/0119237 A1 | 6/2004 | Datta | |
| 2005/0047909 A1 | 3/2005 | Parry | |
| 2006/0214378 A1 | 9/2006 | Zheng | |
| 2006/0249911 A1 * | 11/2006 | Kowalczyk et al. | 277/355 |
| 2006/0255549 A1 * | 11/2006 | Amos et al. | 277/644 |
| 2006/0267291 A1 | 11/2006 | Addis | |
| 2007/0132190 A1 * | 6/2007 | Trabert | 277/355 |
| 2007/0252336 A1 * | 11/2007 | Grabeldinger | 277/355 |

FOREIGN PATENT DOCUMENTS

| | | |
|---|---|---|
| EP | 1215423 A2 | 6/2002 |
| EP | 1544522 A1 | 6/2005 |
| EP | 1653129 A1 | 3/2006 |

* cited by examiner

*Primary Examiner* — Vishal Patel
(74) *Attorney, Agent, or Firm* — Dykema Gossett PLLC

(57) ABSTRACT

A brush seal for use with a housing and sealing a high pressure area from a low pressure area is provided. In an embodiment, the brush seal includes a retainer and a plurality of bristles. The retainer is comprised of a thermally-sensitive material having a thermal expansion rate. The bristles are connected to and extend from the retainer. In an embodiment, the retainer is not fixedly connected to the housing, and the thermal expansion rate of the retainer is greater than the thermal expansion rate of a portion of the housing adjacent the retainer. In another embodiment, a joint associated with a plurality of bristles is permitted to move into a headspace provided above the joint. A method for making a control-gap brush seal assembly for use in connection with a shaft is also disclosed.

22 Claims, 3 Drawing Sheets

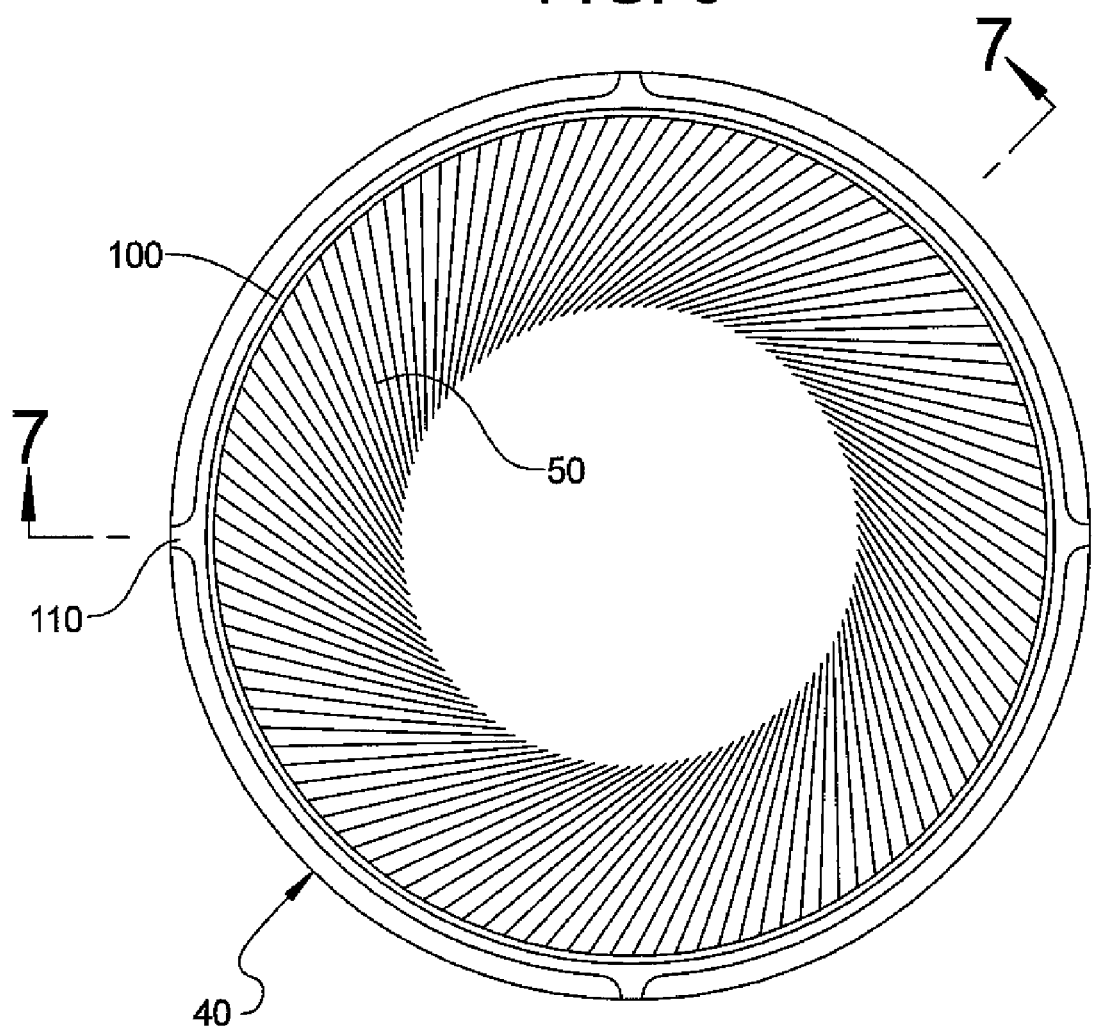
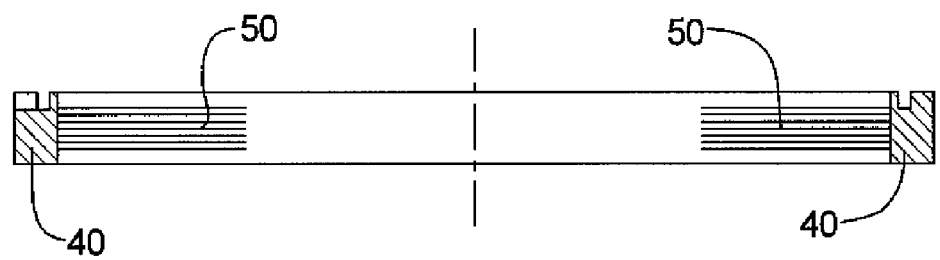

THERMALLY-ACTIVATED CONTROL GAP BRUSH SEAL

TECHNICAL FIELD

The present invention relates to an improved brush seal, including a brush seal which includes a thermally-activated material for controlling a gap associated with the seal.

BACKGROUND

Brush seals provide a technology for sealing high pressure areas from low pressure areas, for example, areas associated with gas turbine engines. Typically, brush seals inhibit the flow of a gas or liquid in a stream along a shaft.

Some brush seal applications involve very high temperatures, which can produce non-uniform thermal growth among associated components. For instance, many engine parts experience significantly higher temperatures during take-off, only to later be reduced during normal operation or equilibrium. Thermal gradient and thermal expansion differences can cause non-uniform thermal growth among various engine parts. Under such conditions, some brush seals have to work with a reduced gap or with an interference fit with respect to a rotating shaft. Another potential drawback associated with prior art brush seals is their tendency to enter into a vicious cycle once the bristles experience heavy contact with the rotating shaft. With conventional brush seals, one end of the bristle is typically attached (either by welding or mechanical clamping) to the seal housing and the seal housing is pressed into seal carrier of the surrounding structural components. The heat generated by the rubbing between the bristles and shaft commonly leads them to grow more and more into each other, which in turn results in more interference and heavier rubbing until heavy wear of bristles reduces the associated interference. Those conditions can increase or accelerate the wear on the brush seal and degradation of the surface of an associated shaft. Consequently, a brush seal that, among other things, helps to address the conditions associated with temperature gradient and thermal expansion differences is desirable.

SUMMARY

According to an aspect of the invention, a brush seal for use with a housing and sealing a high pressure area from a low pressure area is provided. The brush seal includes a retainer and a plurality of bristles. The retainer is comprised of a thermally-sensitive material having a thermal expansion rate. The bristles are connected to and extend from the retainer. In an embodiment, the retainer is not fixedly connected to the housing, and the thermal expansion rate of the retainer is greater than the thermal expansion rate of a portion of the housing adjacent the retainer. In other embodiments, the housing is physically restrained from growth based upon its fit (e.g., press-fit) with respect to surrounding structural components.

BRIEF DESCRIPTION OF THE DRAWINGS

Embodiments of the invention will now be described, by way of example, with reference to the accompanying drawings, wherein:

FIG. 6 is a front view of a brush seal element according to an embodiment of the invention; and FIG. 7 is a partial sectional view of the brush seal element illustrated in FIG. 6.

DETAILED DESCRIPTION

Reference will now be made in detail to embodiments of the present invention, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims.

An embodiment of the invention envisions, among other things, the provision of a brush seal that includes a retainer comprised of a thermally-sensitive material that, at least in part, helps to functionally account for differences in thermal gradients and thermal expansion rates among associated components.

Figure 1:
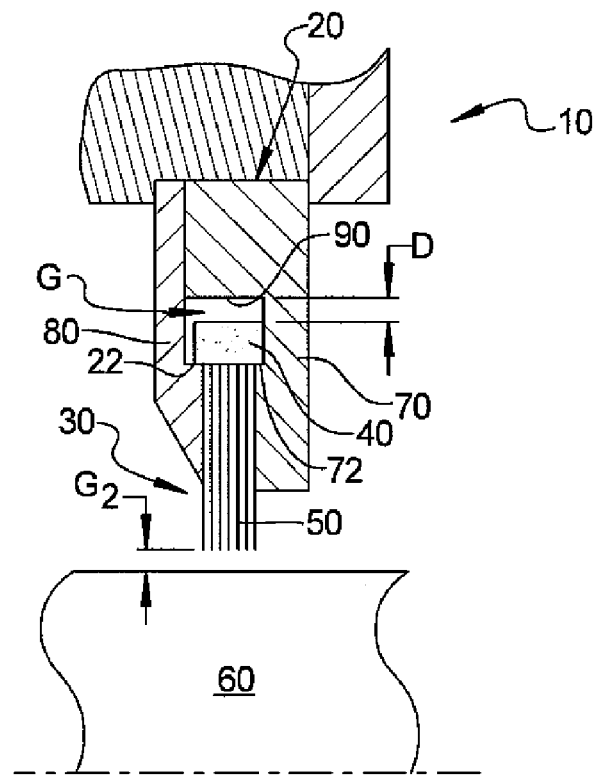
FIG. 1 is a schematic radial cross-sectional view of a brush seal assembly according to an embodiment of the invention.

FIG. 1 illustrates a cross-sectional view of a brush seal assembly 10 according to an embodiment of the invention. Such an assembly may be used, for instance, for sealing a high pressure area from a low pressure area.

The illustrated assembly 10 includes a housing 20 and a brush seal element 30. The brush seal element 30 includes a retainer 40 and a plurality of bristles 50 that are connected to and extend downwardly from retainer 40 toward a shaft 60. By way of example, and without limitation, retainer 40 may be comprised of a stainless steel (e.g., 304L stainless steel) and housing 20 may be comprised of a nimonic 75 high nickel alloy. The bristles 50 may be comprised of various known bristles and generally include a multiplicity of single bristles each bristle having a fixed end and a free sealing end. In an embodiment of the invention, the fixed ends are individually attached in a continuous arrangement at the same angle to retainer 40, the bristles 50 having a substantially uniform pack density throughout the extent of the bristles 50 from the fixed end to the sealing end.

Housing 20 may further include a back plate 70 that is provided on the low pressure side of the brush seal assembly. Back plate 70 may be a separate component, may be comprised of multiple separate components, or may be formed as a single integral portion of housing 20. As generally illustrated, a portion of back plate 70 may abut a portion of bristles 50. In the illustrated embodiment, back plate 70 generally extends downwardly in a direction substantially parallel with the bristles 50 and substantially perpendicular to the housing 20 and/or the shaft 60.

For some applications, the brush seal and/or associated assembly may also include a front plate 80, which may be a separate component or may be formed integrally with the housing 20. Front plate 80 may be provided on the high pressure side of the brush seal assembly and, depending upon the configuration, a portion of the front plate 80 may abut a portion of bristles 50. For some applications, such as that illustrated in FIG. 1, the front plate may be press-fit for inclusion with the assembly 10. Front plate 80 can be configured to, among other things, restrict the lateral movement of the retainer 40 and/or bristles 50, provide support to bristles 50, and/or protect a portion (e.g., an upper portion) of the bristles 50 from pressure and other forces, such as forces associated with air flow or turbulence. For some embodiments, the front plate 80 may comprise a ring, such as a snap ring, that serves to, inter alia, restrict the forward, or lateral, movement of the brush seal components (e.g., away from the back plate 70).

In an embodiment of the invention, a headspace or gap (generally identified as G) is provided above the retainer between the retainer 40 and a surface 90 of housing 20. While retainer 40 is constrained, or at least partially enveloped or surrounded, by a portion of housing 20, the retainer 40 is not fixedly connected to the housing 20. That is, the retainer 40 is free to expand or move (relative to a portion of the housing 20) some distance (D) in a radial direction. For example, the retainer 40 may be permitted to expand or move radially closer to and farther from an associated external shaft 60. The amount of radial movement may, at least in part, be defined or controlled by the configuration of physical components associated with the assembly 10. A benefit of allowing retainer 40 to grow some degree radially is the configuration's ability to help prevent the seal from getting into a vicious cycle of perpetuating interference—i.e., more heat generation and increasing interference until heavy wear of the bristles eventually leads to a reduction in interference. By way of example, and without limitation, the retainer 40 shown in FIG. 1 is generally surrounded by the housing 20 (shown including back plate 70) and a front plate 80. The housing 20 and back plate 70 include edges 22 and 72, respectively, that generally limit the retainer from moving further downwardly in a radial direction (i.e., towards shaft 60). Similarly, surface 90 of housing 20 limits the retainer 40 from further movement in a radially outwardly direction (i.e., away from shaft 60).

In an embodiment of the invention, a gap G is provided between the retainer 40 and a surface 90 of housing 20 and the thermal expansion rate (i.e., coefficient of thermal expansion) of retainer 40 is greater than the thermal expansion rate of a portion of the housing 20 adjacent to the retainer 40 due to a smaller coefficient of thermal expansion and/or because the housing is physically restrained from growth based upon its fit (e.g., press-fit) with respect to surrounding structural components. That is, as the temperature associated with the assembly 10 increases, the retainer 40 is permitted to expand or grow into the gap G. For many typical brush seal applications, a small annular gap G2, or "tip region" (which may be about 0.0002 to about 0.005 inches) is provided between the tips of the bristles 50 and a shaft surface. The permitted "growth" of the retainer 40 in the radially outwardly direction can serve to help prevent an undesirable reduction in the tip region associated with the forcing of the tips of the bristles 50 closer to, or in interfering contact with, a surface of shaft 60. Such a condition could occur, for instance, if retainer 40 expands but is constricted from further radially outward movement (e.g., when no gap for growth is provided between the upper portion of the retainer and the adjacent surface of the housing, and/or the retainer 40 is otherwise rigidly connected to a portion of the housing 20 and/or the back plate 70).

Figure 2:
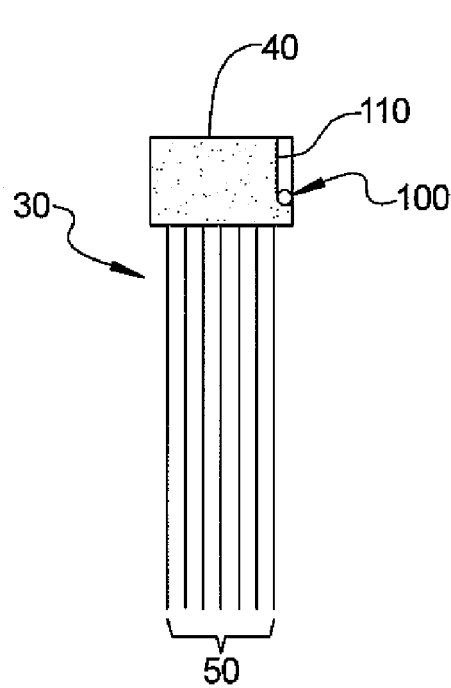
FIG. 2 is a schematic radial cross-sectional view of a brush seal element according to an embodiment of the invention.

A brush seal element 30 according to an embodiment of the invention is generally illustrated in FIG. 2. Brush seal element 30 includes a retainer 40 and plurality of bristles 50. As additionally generally illustrated in FIGS. 6 and 7, retainer 40 may additionally include a circular pressure-balance groove 100 and/or vent groove 10. Because of the pressure differences—i.e., a higher pressure trying to push the retainer 40 against the back plate 70, pressure-balance groove 100 can serve to help permit the retainer 40 to better balance the forces exerted and achieve a condition that better permits the retainer to move radially as intended with respect to housing 20/back plate 70. Vent grooves 10, which can serve to vent to the outside can permit an element of pressure to "counter-balance" pressure exerted against the retainer against the back plate 70 or housing 20, effectively reducing contact force that might inhibit the desired orientation and radial motion of the retainer 40. Such a configuration can reduce brush seal wear at high pressure when the shaft experiences excursion.

Figure 3:
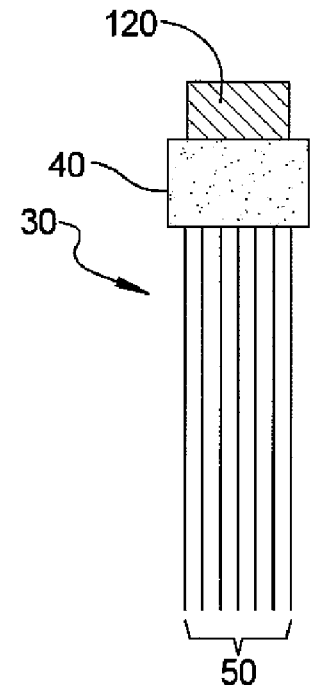
FIG. 3 is a schematic radial cross-sectional view of a another brush seal design according to another embodiment of the invention.

Another embodiment of a brush seal element 30 is shown in FIG. 3. The illustrated brush seal element 30 is similar to that depicted in FIG. 2, but additionally includes a band 120. Band 120 can, among other things, serve as an amplifier of thermal sensitivity for the brush seal element 30. Band 120 may, under some conditions, serve as a spacer or "spacing" element in connection with gap G provided between the retainer 40 and a surface 90 of housing 20. The inclusion of a band 120 can be a useful tool for situations in which the thermal expansion coefficient of the retainer is not high enough to exceed or "outgrow" the shaft growth. The band 120, not limited by weldability, can be comprised of materials with comparatively higher thermal expansion coefficients. For instance, at room temperature, the retainer 40 may be press-fitted into an associated band. Such a retainer is effectively squeezed into a comparatively smaller or reduced diameter. At higher temperature, the band relieves the squeeze on the retainer 40 so that the retainer can expand from the disappearance of mechanical force on top of its own thermal expansion. Such an embodiment permits a user to tweak the assembly to achieve desired functional responses for intended temperature profiles. In an embodiment of the invention the band is comprised of a metal. However, one skilled in the art will understand that the band 120 is not limited to a specific metal or other material provided the band 120 can function as desired in an intended environment.

Figure 4:
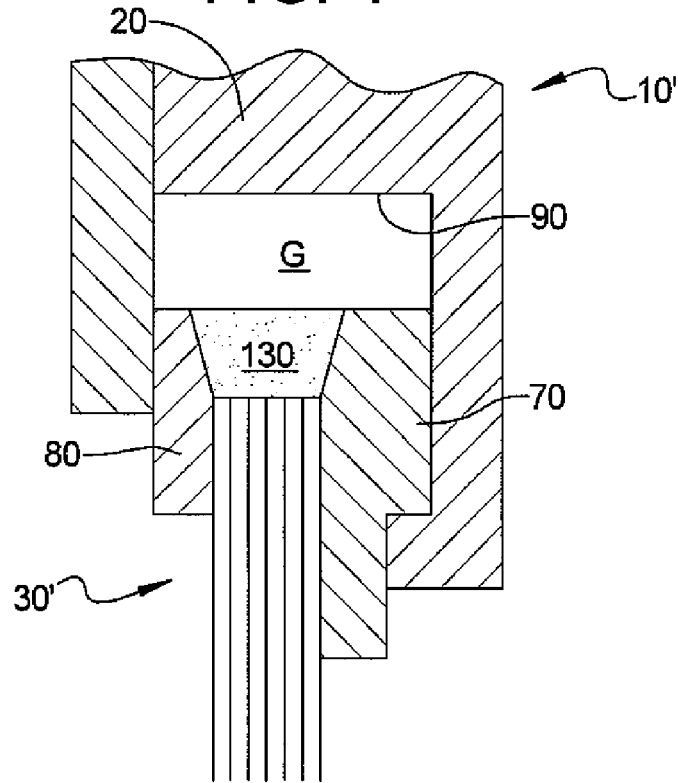
FIG. 4 is a schematic radial cross-sectional view of a brush seal assembly according to another embodiment of the invention.

FIG. 4 illustrates a brush seal element 30', which includes a back plate, and a brush seal assembly 10' according to an additional embodiment of the invention. It is noted that with respect to FIGS. 4 and 5, similar elements to those previously described are identified with similar element designations. Unlike the embodiment associated with FIG. 1, brush seal element 30' does not include a retainer of the type previously described. Rather, a joint 130 is provided that secures bristles 50 at their upper ends (i.e., the ends at the opposite end of the tip region). Brush seal element 30' which includes a plurality of bristles 50, may also include an adjacent back plate 70 and a ring or front plate 80. Similarly, as with the previously described embodiments, the brush seal element 30' is not fixedly connected to housing 20 and brush seal assembly 10' also includes a gap G (see e.g., FIG. 4) positioned above the joint 130 and beneath a surface 90 of housing 20. As before, gap G provides joint 130 with space for radially upward/outward movement or growth in response to thermal conditions acting upon the assembly 10'.

Figure 5:
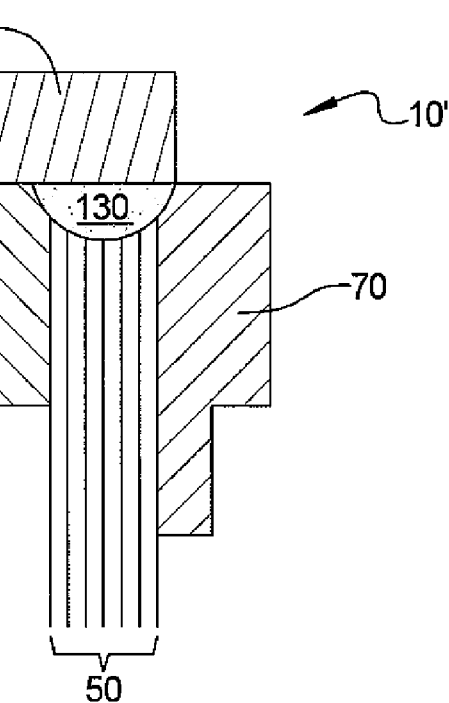
FIG. 5 is a schematic radial cross-sectional view of a brush seal assembly according to yet another embodiment of the invention.

FIG. 5 illustrates a brush seal element 30" similar to that shown in FIG. 4, with the inclusion of a band 120'. Band 120' may have an interference fitting with respect to the front plate 80, the joint 130, and/or the back plate 70. As with the band 120 discussed in connection with FIG. 3, band 120' can be formed of a highly temperature sensitive material and, among other things, can serve as an amplifier of thermal sensitivity for the brush element 30" or as a spacer or "spacing" element in connection with gap G provided between the joint 130 and a surface 90 of housing 20. As with previously described band 120, band 120' can be press-fit. Further, the selection of materials associated with the band 120' can permit a user to tweak the assembly to achieve desired functional responses for intended temperature profiles. In an embodiment of the invention the band is comprised of a metal. However, one skilled in the art will understand that the band 120' is not limited to a specific metal or other material provided the band 120' can function as desired in an intended environment.

Embodiments of the present invention provide a mechanism for users to provide an improved control-gap brush seal assembly that is very flexible and is capable of being used both with specially-designed and various conventional housings. Commonly, designers of brush seal assemblies have a thorough understanding of the critical phases associated with a given application. The present invention permits a designer to select materials and provide gaps that provide the most desirable operational or functional sealing characteristics.

For example, an assembly can be configured so that a given starting clearance or tip region is provided. By selecting the materials associated with the brush seal and housing, as well as configuring an associated headspace or gap, a more desirable clearance or tip region may be provided at increased temperatures. Further, depending on the parameters associated with the housing, a designer may utilize a band or other spacing mechanism to further control the gap and the related expansion/movement of the brush seal.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. It is intended that the scope of the invention be defined by the claims appended hereto and their equivalents.

What is claimed is:

1. A brush seal substantially surrounded by, but not fixedly connected to, a housing including a back plate, the brush seal sealing a high pressure area from a low pressure area, and the brush seal comprising:
   a retainer comprised of a thermally-sensitive material having a thermal expansion rate;
   a band positioned above and directly connected to an upper surface of the retainer, the band having a higher thermal expansion coefficient than the retainer; and
   a plurality of bristles connected to and extending from the retainer;
   wherein the retainer is not fixedly connected to said housing, and the thermal expansion rate of the retainer is greater than the thermal expansion rate of a portion of said housing adjacent to the retainer.

2. The brush seal of claim 1, wherein the retainer is a ring.

3. The brush seal of claim 1, wherein the bristles are welded to the retainer.

4. The brush seal of claim 1, wherein the retainer includes a pressure-balance groove.

5. The brush seal of claim 4, wherein the groove includes one or more vents.

6. The brush seal of claim 1, wherein the back plate is integrally formed with the housing.

7. The brush seal of claim 1, wherein the thermally-sensitive material comprises a stainless steel.

8. The brush seal of claim 1, wherein the band is comprised of a temperature sensitive material having a higher thermal expansion rate than the portion of the housing adjacent the band.

9. The brush seal of claim 1, wherein the retainer is comprised of a composite.

10. The brush seal of claim 9, wherein the retainer is comprised of two or more rings having different thermal expansion rates.

11. The brush seal of claim 1, wherein a headspace is provided between the retainer and said housing adjacent the retainer, the headspace permitting the retainer to grow into the headspace.

12. A brush seal assembly for use in connection with a shaft, the assembly comprising:
   a brush seal including a retainer comprised of a thermally-sensitive material, a band positioned above and directly connected to an upper surface of the retainer, and a plurality of bristles extending from and connected to the retainer, the retainer having a thermal expansion rate, and the band having a higher thermal expansion rate than the retainer; and
   a housing including a back plate, the back plate having a surface portion adjacent a portion of the length of the bristles and extending in a direction substantially parallel to the bristles,
   wherein the thermal expansion rate of the retainer is greater than the thermal expansion rate of a portion of said housing adjacent the retainer, and the retainer is free to move in a radial direction, relative to said shaft, along or about a portion of the back plate.

13. The assembly of claim 12, wherein, at certain temperatures, a gap is provided between an upper surface of the retainer and a portion of the housing positioned radially above the upper surface.

14. The assembly of claim 13, wherein the volume of the gap for a given temperature is controlled, at least in part, by selection of materials comprising the retainer, the housing, or both the retainer and the housing.

15. The assembly of claim 12, including a front plate or snap ring connected to the housing, the front plate or snap ring being configured to restrict movement of the retainer in a direction substantially perpendicular to the bristles.

16. The assembly of claim 15, wherein the front and back plates are comprised of a material having a different thermal expansion coefficient than the housing.

17. The assembly of claim 12, wherein the band is comprised of metal.

18. The assembly of claim 12, wherein the thermal expansion rate of the retainer is greater than the thermal expansion rate of a portion of said housing adjacent the retainer.

19. The assembly of claim 12, wherein the retainer includes a pressure-balance groove.

20. The assembly of claim 19, wherein the groove includes one or more vents.

21. The assembly of claim 12, wherein the thermally-sensitive material comprises a stainless steel.

22. The assembly of claim 12, wherein the retainer is comprised of a composite.

* * * * *